Jan. 15, 1929.  V. L. HUGHES  1,698,814
KITCHEN UTENSIL
Filed May 2, 1925
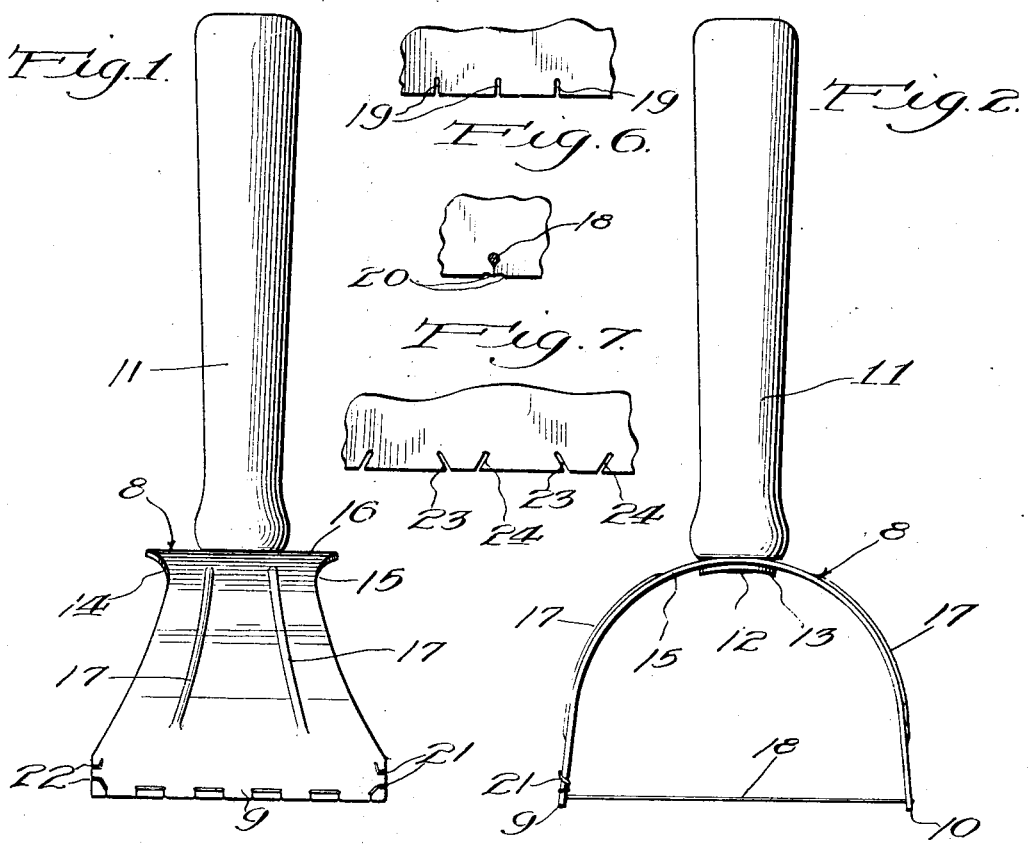
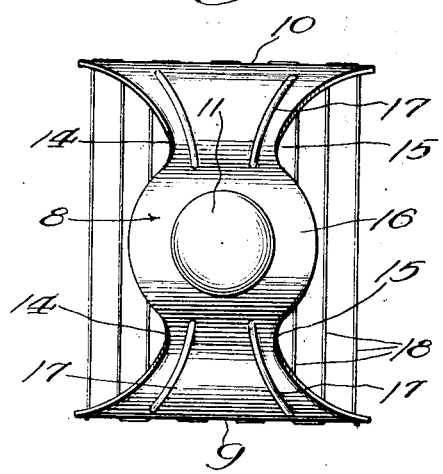
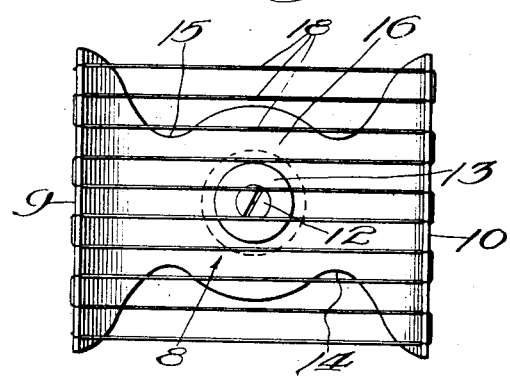
Inventor:
Vincent L. Hughes Patented Jan. 15, 1929.

1,698,814

UNITED STATES PATENT OFFICE.

VINCENT L. HUGHES, OF CHICAGO, ILLINOIS, ASSIGNOR TO I. L. LINDEBLAD, OF CHICAGO, ILLINOIS.

KITCHEN UTENSIL.

Application filed May 2, 1925. Serial No. 27,350.

This invention has to do particularly with improvements in kitchen utensils. It relates particularly to improvements in utensils for mixing pastry and other similar materials, as well as for mixing dough generally.

The main object of the invention is to provide a utensil of very simple and inexpensive construction and one which will be very effective in its work and will thus serve very perfectly to thoroughly mix the ingredients together.

Another object of the invention is to provide a utensil of such construction that it will be practically self cleaning. In this connection, it is an object to provide a construction which will practically eliminate the presence of cracks and crevices, as well as projections of such size and form as to readily catch and hold particles of the material being worked. That is to say, it is an object to provide a construction such that the surfaces coming into contact with the material will not readily pick up portions thereof, but will very perfectly shed the same and thus be practically self cleaning.

Other objects are to provide a new and improved form of body member for supporting the cutting wires; and in this connection to provide a construction such that the operator will be afforded a ready and convenient view of the operations being carried on. A further object in this connection is to provide a construction such that the body member will have a certain amount of spring action, sufficient in fact to retain the cutting wires under such a tension that they will effectively perform their work.

Other objects and uses of the invention will appear from a detailed description of the same, which consists in the features of construction and combinations of parts hereinafter described and claimed.

In the drawing:

Figure 1 shows a side elevation of a utensil embodying the features of the present invention;

Fig. 2 shows an edge view at right angles to that of Fig. 1;

Fig. 3 shows a top view corresponding to Figs. 1 and 2;

Fig. 4 shows a bottom view corresponding to Fig. 3;

Fig. 5 shows a fragmentary side view of one of the lower edges of the body member on enlarged scale, as compared to the previous figures, showing the slots in their open position, parallel slots being illustrated;

Fig. 6 shows a view similar to that of Fig. 5, with the exception that the cutting wire has been inserted into a slot and the open portion of the slot has been closed by riveting or otherwise; and Fig. 7 shows a view similar to that of Fig. 5, with the exception that it illustrates a modified type of construction in which the slots are cut at alternately opposite angles.

The body member itself is of U shape, as best illustrated in Fig. 2, and is designated by the numeral 8. Its lower edge portion 9 and 10 are of full width, as shown in Figs. 1, 3 and 4, and are parallel. A handle 11 is secured directly to the upper central portion of the member 8 in any convenient manner as by means of a screw 12 and washer 13 (see Fig. 4).

Preferably the sides of the body member are cut back above their lower edges 9 and 10, as shown at 14 and 15 in particular, so as to give a better view of the material which is being worked by the cutting wires. If desired, the central upper portion 16 to which the handle 11 is connected may be of enlarged size, as compared to the recessed portions 14 and 15, such construction being illustrated.

Preferably also the curved sides of the body member 8 are each provided with one or more ribs 17, the same being formed by pressing or otherwise, and serving to improve the stiffness and springiness of the U shaped body member.

A series of cutting wires 18 are stretched across the parallel edges 9 and 10 and are retained under sufficient tension by reason of the stiffness and springiness of the body member 8. Preferably, these wires are secured in place by weaving them back and forth within shallow slots 19 (see particularly Fig. 5) which slots are thereafter closed, as shown at 20 in Fig. 6, so as to close them and retain the wires in place. Manifestly, a single length of wire may be woven back and forth through the slots of the two edges 9 and 10, as best indicated in Figs. 3 and 4, the wire lying tight against the outside face of the lower edge portions 9 and 10 at the points where it passes from one notch to the next. The ends of the wire may be woven into suitable supplemental slots 21 and 22, as shown in Fig. 1, which then may be also closed to lock the ends in place.

I prefer to make use of piano wire or something similar thereto for the above purpose, since the same is of very high tensile strength, may be easily woven into place, is of small size, and will not easily rust.

It will be noted that the utensil herein disclosed is of such a nature that there are exposed practically no projections upon which dough or similar material may catch during the use of the device. Under the circumstances, the utensil may be extremely sanitary from this as well as other standpoints.

The construction shown in Fig. 7 is slightly different from that just explained in the sense that the alternating slots 23 and 24 are formed at an angle with respect to each other, so that when the wire has been drawn tightly into place it may be retained in said slots even independently of any closing of the slots.

While I have herein shown and described only certain embodiments of the features of my present invention, still I do not intend to limit myself to the same, except as I may do so in the claims.

I claim:

1. As a new article of manufacture, a kitchen utensil for working dough and the like, comprising in combination a frame member of substantially semi-cylindrical form having its upper central side portions cut backwardly towards its central axis to thereby establish a mid portion of reduced width as compared to the extreme edges of the frame, and establish a resiliency therein, a handle secured to said mid portion, and a series of transverse cutting wires extending between the free edge portions of the frame and normally maintained under tension by the resiliency of the frame member, substantially as described.

2. As a new article of manufacture, a kitchen utensil for working dough and the like, comprising in combination a substantially semi-cylindrical frame member of spring material having its upper central portion of reduced width as compared to its lower unconnected edge portions, to thereby improve the elasticity and resiliency of the frame, together with a series of cutting wires extending between the lower free edges of the frame and normally retained under tension by the elasticity of the frame, and a suitable handle secured to the central portion of the frame, substantially as described.

3. As a new article of manufacture, a kitchen utensil for working dough and the like comprising in combination a substantially semi-cylindrical frame member of spring material having its upper central side portions recessed towards each other to establish a connecting neck of reduced width and increased elasticity, and a series of cutting wires extending between the free edges of the frame member and normally retained under tension by the elasticity of the frame member, the shape of the frame member permitting of a maximum degree of visibility of the cutting wires and material being worked upon, substantially as described.

VINCENT L. HUGHES.